April 2, 1963  R. E. STARK  3,083,976
CHUCK FOR SHANK-TYPE PINIONS AND THE LIKE
Filed Jan. 25, 1962

INVENTOR.
ROBERT E. STARK
BY
Richard W. Treverton
ATTORNEY

3,083,976
CHUCK FOR SHANK-TYPE PINIONS AND THE LIKE
Robert E. Stark, Pittsford, N.Y., assignor to The Gleason Works, Rochester, N.Y., a corporation of New York
Filed Jan. 25, 1962, Ser. No. 168,695
9 Claims. (Cl. 279—51)

The present invention relates to a chuck for supporting shank-type pinions or similarly shaped workpieces in a machine tool, such as a gear cutting, lapping or testing machine.

A widely used chuck of this kind comprises a body having a front face for seating the back face of the head of the workpiece, an axial bore for receiving the shank of the workpiece, and a means for aligning the shank with the axis of the body and for gripping and urging it axially rearward to draw the back face of the head against the front face of the chuck.

The tooth surfaces of pinions finished while held in such chucks have sometimes exhibited eccentricity in subsequent testing and use, and the primary object of the invention is to eliminate this fault insofar as its cause may lie in the chuck. I have discovered the primary cause to be non-perpendicularity of the back face of the pinion head relative to the pinion shank, a distortion which frequently occurs during heat treatment after cutting of the teeth. When the pinion is chucked the inward draft tends to press the head flat against the front face of the chuck, thereby elastically tilting it relative to its shank. Tooth surfaces correctly finished while the head is so tilted become eccentric when the pinion is dechucked and returns to its normal untilted condition. I have also found that a similar although usually less serious cause of eccentricity in the finished workpieces is uneven wear of the front face of the chuck, which may cause a similar elastic tilting of the head of the workpiece.

In order to avoid such eccentricity it is an object of the invention to provide a chuck of simple and inexpensive construction in which the front portion, against which the workpiece head seats, is arranged to compensate for non-perpendicularity of the head relative to its shank and of the front face of the chuck relative to the chuck axis. A chuck according to the invention comprises a body whose front portion has a face for seating the back face of the head of a workpiece and an axial opening for receiving the shank of the workpiece, means axially movable in the body for gripping and aligning the shank with the axis of said body and for urging it rearwardly in the body to draw the head against the face of said front portion, said front portion being flexible relative to the main portion of the body to enable its face to tilt relative to said axis to compensate for non-perpendicularity of one or both of said faces to said axis.

The foregoing and other objects and advantages of the invention will appear from the following description of the preferred embodiments shown in the accompanying drawings, in which.

Figure 1:
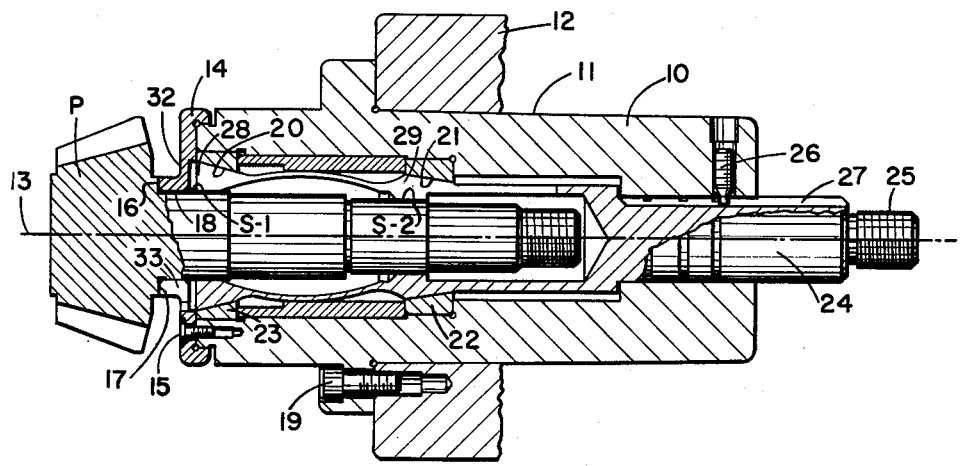
FIG. 1 is a longitudinal section through a chuck in the planes indicated by a section line 1—1 of FIG. 2.

The particular chuck shown in FIG. 1, designed for supporting an automotive bevel or hypoid drive pinion P in a lapping or testing machine, is of the general arrangement described and claimed in Patent No. 2,935,329, granted May 3, 1960. It comprises a tubular body whose main section 10 has a conical surface 11 for seating in the tapered bore of the work spindle 12 of the machine, the axis of rotation of the spindle and the chuck being designated 13. A workpiece backing ring 14 constitutes a part of the chuck body, being secured to the main section 10 by screws 15. Front face 16 of the ring constitutes a seat for the back face 17 of the head of pinion P, and the central bore 18 of the ring constitutes a guide surface for the shank of the pinion. The chuck is secured to the spindle 12 by a plurality of screws 19.

The shank of the particular pinion P that is shown has cylindrical surfaces S–1 and S–2 which the chuck is designed to center and grip. Surrounding these two surfaces the chuck has internal conical surfaces 20 and 21 formed in rings 23 and 22 which are secured in bores in the body section 10. The axes of surfaces 20 and 21 are coincident with axis 13.

A work-engaging collet is arranged for limited axial motion in the chuck body. It comprises a cylindrical stem 24 slidable in a bore in the rear of the body and provided with a threaded connection 25 to a draw rod, not shown, which is connectible to a suitable chuck actuator, also not shown. A key 26 engaging in keyway 27 in stem 24 holds the collet against rotation in the chuck body. Extending forwardly from stem 24 the collet has a substantially tubular portion which is split longitudinally to render it expansible and contractible. The split portion has two sets of workpiece engaging sections. The sections 28 of the forward set being adapted to grip and center cylindrical shank surface S–1 and sections 29 of the rear set being adapted to grip and center cylindrical shank surface S–2. For this purpose the inner faces sections 28 and 29 are complementary in shape to surfaces S–1 and S–2.

In operation, after a workpiece is placed in the chuck the collet is moved axially rearwardly in body section 10 by the action of the actuator, causing the sections 28 and 29 to be cammed radially inward by surfaces 20 and 21 and thereby grip and align surfaces S–1 and S–2 of the pinion with the axis 13. As this action takes place the collet also draws the pinion axially rearward in the chuck body, pressing the rear face 17 of the pinion head against the front face 16 of the chuck with great force. When the pinion is fully chucked, the axis of the shank coincides with the axis 13 of the spindle and the back face 17 of the head lies flat against face 16 of the chuck. This has led to the problem discussed hereinbefore where, as in the chucks known heretofore, the backing ring has been made rigid so that face 16 is in fixed relation to axis 13 and main section 10.

According to the present invention the front portion of the chuck body, i.e. in the illustrated embodiment the portion of the backing ring 14 which has workpiece-seating front face 16, is made flexible relative to the main portion of the chuck body which comprises the main section 10 and the portion of the backing ring that is secured to it by screws 15. To this end the backing ring is formed with relatively rigid inner rim 30 and outer rim 31 coaxial of axis 13, the inner rim having the seating face 16 perpendicular to the axis, the outer rim being rigidly secured by screws 15 to main section 10, and the rims being integrally connected by a relatively thin web 32 extending between them substantially in a plane perpendicular to the axis and adapted to permit limited axial and tilting movements of the inner rim relative to the outer one. Preferably this flexibility is increased by cutting a plurality of slits 33 through the inner rim and the web. These slits are radial of axis 13, are equally spaced therearound, and for convenience of manufacture, and better stress distribution, terminate in drilled holes 34 through the radially outer portion of the web.

When setting up the lapping machine, or other machine on which the chuck is employed, and in which the axial position of the pinion is critical, allowance should be made for the axial compression of the backing ring under the partciular draw rod load that will be applied by the chuck actuator. The amount to be allowed may readily be determined by measuring the reduction in the distance between the front face of outer rim 31 and the front face of a master pinion mounted in the chuck when draw rod pressure is applied. If set-up gages are employed in place of master gears, as is conventional for lapping and testing machines, the allowance is made automatically.

Figures 2, 3, 4:
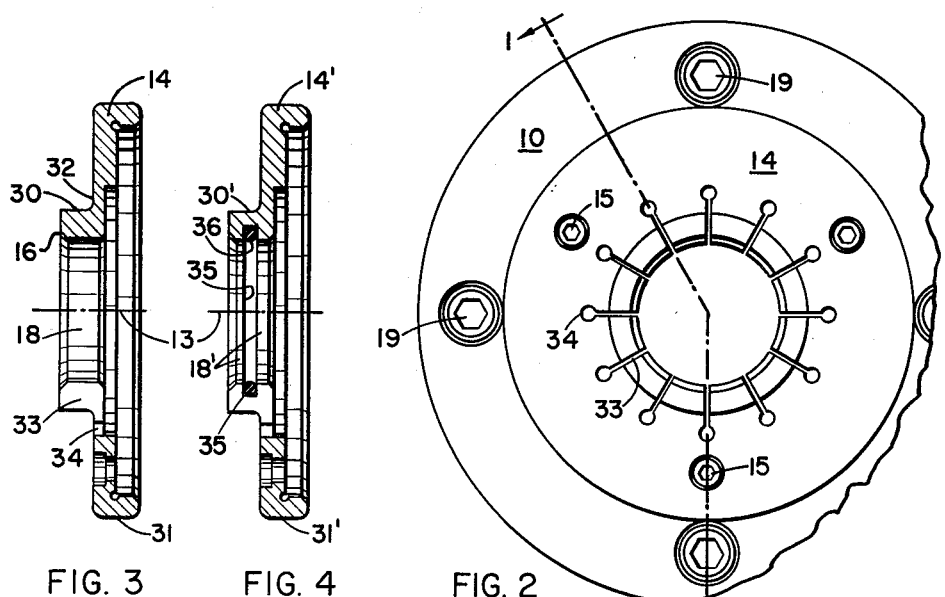
FIG. 2 is a front view of the chuck.
FIG. 3 is a section, also in the planes designated 1—1 in FIG. 2, of the backing ring of the chuck shown in FIGS. 1 and 2.
FIG. 4 is a section similar to FIG. 3 through a modified backing ring.

In order to protect the interior of the chuck from foreign matter the slits 33, including the holes 34, are preferably filled with a rubber-like material. For further protection the backing ring may be modified as shown at 14' in FIG. 4, by providing an annular groove 35 in the inner circumferential surface 18' of the inner rim 30' of the ring. A wiper in the form of an O-ring 36 of rubber-like material is seated in this groove and protrudes radially inwards therefrom for wiping foreign matter from the shank of the workpiece while the latter is being inserted in the chuck.

Having now described the preferred embodiments of my invention and explained the operation thereof, what I claim is:

1. A chuck comprising a body whose front portion has a face for seating the back face of the head of a workpiece and an axial opening for receiving the shank of the workpiece, means axially movable in the body for gripping and aligning the shank with the axis of said body and for urging it rearwardly in the body to draw the head against the face of said front portion, said front portion being flexible relative to the main portion of the body to enable its face to tilt relative to said axis to compensate for non-perpendicularity of one or both of said faces to said axis.

2. A chuck according to claim 1 in which said front portion comprises a rim having said face for seating the head and a flexible web extending radially outwards from the rim and connecting the latter to said main body portion.

3. A chuck according to claim 2 in which said rim and web have a plurality of radial slits therethrough to increase the flexibility thereof in an axial direction.

4. A chuck according to claim 3 in which said rim has an annular groove extending around the inner circumferential surface thereof, and a ring of rubber-like material seated in said groove and protruding radially inwards therefrom for wiping engagement with the shank of a workpiece upon insertion of the latter into the chuck.

5. A chuck according to claim 1 in which the chuck body comprises a main section and, at the front of said main section, a workpiece backing ring, said ring comprising relatively rigid coaxial inner and outer rims integrally connected by a relatively thin and flexible web extending between them substantially in a plane perpendicular to said axis, said inner rim constituting said front portion of the chuck body and having said face for seating the head of the workpiece, and said outer rim being secured to said main section and together therewith constituting the main portion of the chuck body.

6. A chuck according to claim 5 in which said inner rim and web have a plurality of radial slits to increase the flexibility thereof in an axial direction.

7. A backing ring for the front of a body of a chuck for shank type pinions or like workpieces, said ring comprising relatively rigid coaxial inner and outer rims integrally connected by a relatively thin and flexible web extending between them substantially in a plane perpendicular to their common axis, the inner rim having its front end face adapted to seat the head of a workpiece and its central opening adapted to pass the shank of the workpiece, and the outer rim being adapted for rigid connection with the main body section of the chuck.

8. A backing ring according to claim 7 in which said inner rim and web have a plurality of radial slits to increase the flexibility thereof relative to the outer rim in an axial direction.

9. A backing ring according to claim 8 in which said inner rim has an annular groove extending around the inner circumferential surface thereof, and a ring of rubber-like material seated in said groove and protruding radially inwards therefrom for wiping engagement with the shank of a workpiece upon insertion of the latter into the chuck.

References Cited in the file of this patent

UNITED STATES PATENTS

| | | |
|---|---|---|
| 2,376,594 | Hite | May 22, 1945 |
| 2,553,178 | Day | May 15, 1951 |
| 2,873,121 | Hahn | Feb. 10, 1959 |
| 2,935,329 | Hessler | May 3, 1960 |